United States Patent
Lee et al.

(10) Patent No.: US 6,343,059 B1
(45) Date of Patent: Jan. 29, 2002

(54) READING-WRITING PICKUP HEAD

(75) Inventors: Yuan-Chin Lee; Zu-Wen Chao, both of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/376,669

(22) Filed: Aug. 16, 1999

(30) Foreign Application Priority Data

Apr. 13, 1999 (TW) .......................................... 88105835 A

(51) Int. Cl.$^7$ ................................................. G11B 7/12
(52) U.S. Cl. .............................. 369/112.28; 369/112.01; 369/110.01
(58) Field of Search ........................... 369/44.11, 44.12, 369/44.14, 44.23, 44.37, 47.1, 53.1, 110.01, 110.04, 112.01, 112.02, 112.09, 112.21, 112.28

(56) References Cited

U.S. PATENT DOCUMENTS 3,643,178 A * 2/1972 Marshall ........................ 372/24
4,546,463 A * 10/1985 Opheij et al. ........... 369/112.17
4,730,297 A * 3/1988 Ishibashi et al. ....... 369/112.16

* cited by examiner

*Primary Examiner*—Muhammad Edun
(74) *Attorney, Agent, or Firm*—W. Wayne Liauh

(57) ABSTRACT

This invention concerns a reading-writing pickup head for data access on optical record media. The pickup head of the present invention includes a birefringent prism and a quarter-wave plate where the birefringent prism is made of double-refraction material with different refraction indices on different polarizations, and it is used to split the incident and reflection beams of the pickup head. According to the present invention, the prism and the polarized beam splitter of a pickup head of the related art are replaced with the birefringent prism. Consequently, the number of optical elements of the pickup head according to the present invention is reduced.

3 Claims, 2 Drawing Sheets

READING-WRITING PICKUP HEAD

FIELD OF THE INVENTION

The present invention relates to a reading/writing pickup head, and more particularly to an optical pickup head for reading or writing data on optical record media such as compact disks or digital versatile disks.

BACKGROUND OF THE INVENTION

It is known that optical pickup heads are used to record and reproduce information such as video or audio data on and from optical data recording media. One characteristic function of a pickup head is to shape a laser beam for efficiently reading and recording data on an optical medium. This function comes from two reasons: Firstly, Since it needs much power for a pick-up head to write data on a disk. The collimator should collect more power from the laser source in order to reduce the load of the laser source. Secondly, in general, the laser beam is produced by a laser diode, and the shape of the laser beam is originally elliptical. In order to increase the reading and writing quality of the pickup head, the laser beam is shaped to be circular. The other characteristic function of the pickup head is to split the incident and reflected light branches for reducing the interference of both light branches as the reading and record operation of the pickup head.

A pickup head of the related art is shown in FIG. 1. A prism 91 made of optical glass is placed in the incident branch of the pickup head, and it is used to shape the elliptical laser beam to a circular beam. In order to split the incident and reflected branches of the pickup head, a polarized beam splitter (PBS) 93 and a quarter-wave plate (¼ λ plate) 94 are used. In order to achieve both characteristic functions of a pickup head mentioned above, a lot of optical elements are required in the related art.

SUMMARY OF THE INVENTION

The object of the invention is to provide a pickup head which consists of fewer optical elements than the related art without losing both characteristic functions of a pickup head. With the pickup head of the present invention, the reading and writing quality of optical record media is increased.

According to the present invention, a birefringent prism and a quarter-wave plate are placed in the light path of the pickup head. The birefringent prism is made of double-refraction material. The refraction index of a double refraction material depends on the angle between its optical axis and the polarization of the incident beam. In other words, the double-refraction material may h as two different refraction indices for two different polarized beams, for example, for beams with polarization parallel and perpendicular to the optical axis. The birefringent prism is used to shape the elliptical laser beam as the prism of the related art, and used to split the incident and reflected branches of the shaped laser beam as the polarized beam splitter of the related art where the incident beam and the reflected beam have different polarizations. The prism and polarized beam splitter of the related art are replaced with the birefringent prism in the pickup head of the present invention.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
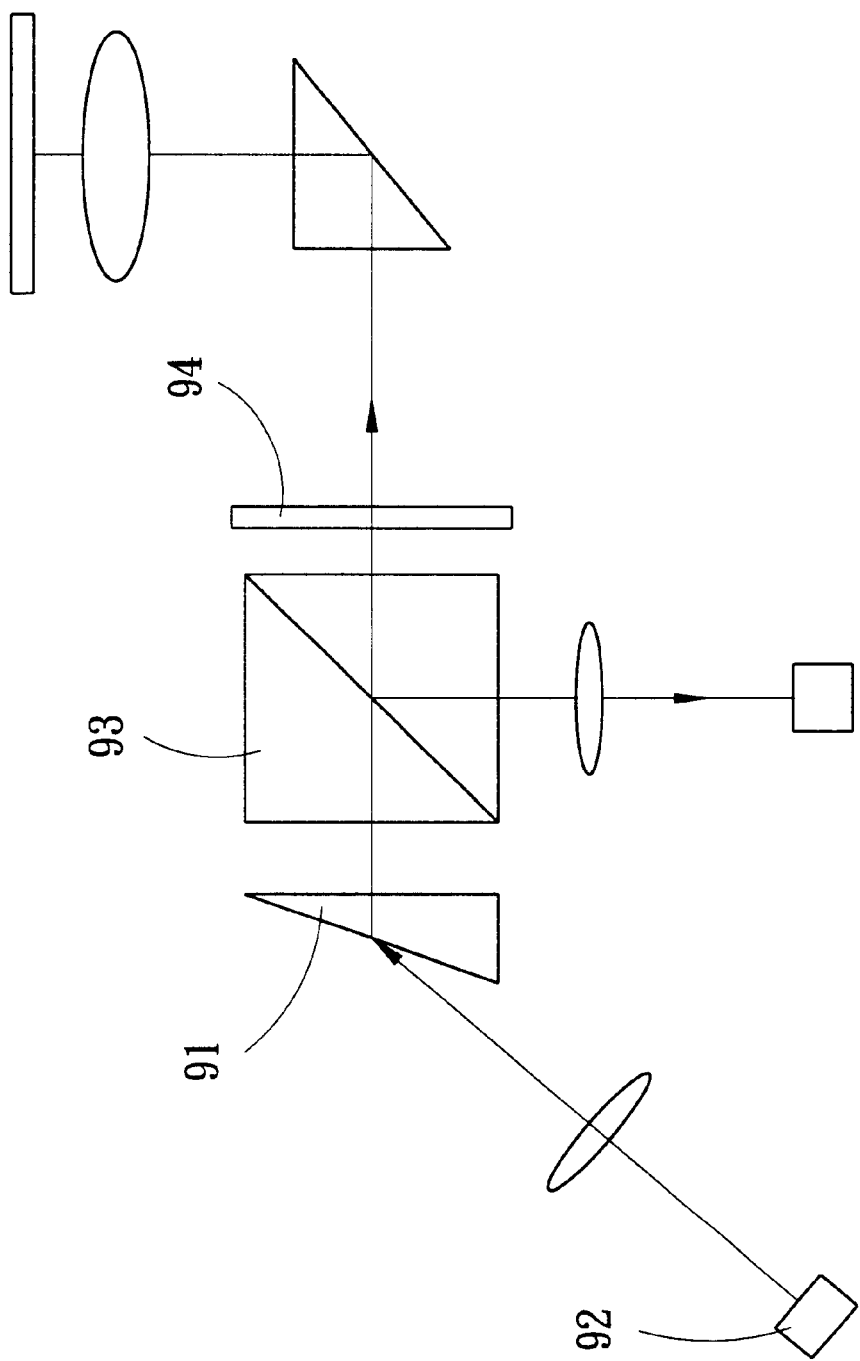
FIG. 1 shows the configuration and light path of a pickup head according to the related art.
Figure 2:
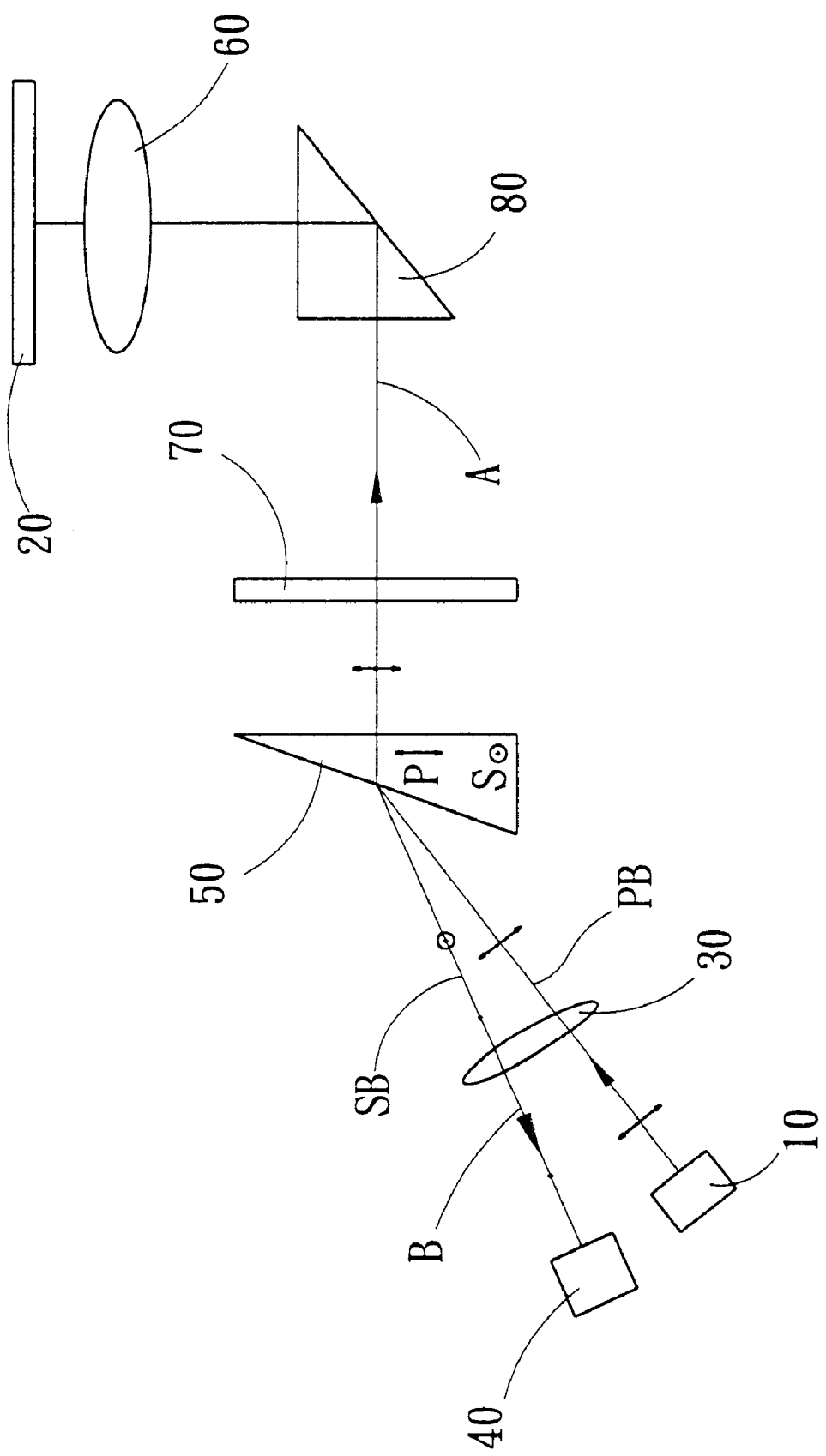
FIG. 2 is the configuration and light path of a pickup head according to the present invention.

Referring to FIG. 2, an optical pickup head of the present invention includes a laser source 10, a collimator 30, a photo detector 40, a birefringent prism 50, an objective lens 60, a quarter-wave plate 70 and a reflection mirror 80. Generally, the laser source 10 is a laser diode which is used to produce a linearly polarized beam for reading or writing data on an optical record medium 20. The collimator 30 collimates the linearly polarized beam of the laser source 10. The photo detector 40 transfers the intensity of a light beam to an electric signal. The birefringent prism 50 is made of double-refraction material which induces two refracted light beams with two different directions and different polarizations for an incident light beam, and is used to split the incident beam A and the reflected beam B of the pickup head of the present invention. The objective lens 60 is placed on the light path of the pickup head for focusing the laser beam onto the optical record medium 20. The quarter-wave plate 70 is placed on the light path of the pickup head between the birefringent prism 50 and the objective lens 60 to make the polarizations of the incident beam A and the reflected beam B orthogonal. When the collimated linearly polarized laser beam passes through the quarter-wave plate, its polarization becomes circular polarization. And when the reflected circular polarization beam passes through the quarter-wave plate again, it becomes linearly polarized with the polarization rotated by 90 degrees from that of the former incident laser beam. The reflection mirror 80 is placed on the light path between the quarter-wave plate 70 and the objective lens 60, and it is used to change the travel direction of the linearly polarized beam for reducing the size of the pickup head of the present invention.

According to the property of double-refraction material, there are two axes called the fast and slow axes. In addition, both axes are orthogonal and the refraction index on the fast axis is smaller than that on the slow axis. According to the Snell's law, as a wave travels from a medium to another medium with different refraction index, the wave is then refracted with a refraction angle. Hence, two waves with different polarizations traveling through double-refraction material will be refracted with different refraction angles. The birefringent prism 50 uses the above property to split the incident and reflected beam of the pickup head of the present invention.

Referring to FIG. 2, the laser source 10 generates an elliptic and linearly polarized beam PB with wave-length λ, and the polarization P of the linearly polarized beam is parallel to the plane of incidence. The linearly polarized beam PB is first collimated by the collimator 30, and then travels through the birefringent prism 50. The birefringent prism 50 makes the shape of the linearly polarized beam PB circular, and changes the travel direction of the linearly polarized beam PB. Along an incident path A, the linearly polarized beam PB is transmitted through the quarter-wave plate 70, the reflection mirror 80 and the objective lens 60. The objective lens 60 focuses the linearly polarized beam PB onto the optical record medium 20, and a beam SB is then reflected from the optical record medium 20. The reflected beam SB is transmitted through the objective lens 60, the reflection mirror 80 and the quarter-wave plate 70. The quarter-wave plate 70 indeed makes the polarization of the reflected beam SB orthogonal to the plane of incidence. The reflected beam SB with orthogonal polarization S travels through the birefringent prism 50, and the reflected beam SB is then refracted along a reflected path B which is deviated from the incident path A. The reflected beam SB is finally projected onto the photo detector 40. The photo detector 40 transfers the optical information carried by the reflected beam SB to corresponding electric signals for the reading operation of the pickup head according to the present invention.

In order to achieve the writing operation of the pickup head according to the present invention, a signal generator is used to modulate the light intensity of the laser beam produced by the laser source 10 according to the data needed to be stored. During the writing operation, the light path of the pickup head of the present invention is same as that during the reading operation. The modulated laser beam is hence focused onto the optical record medium 20 by the objective lens 60. The light intensity of the modulated laser beam induces the variation of the physical or chemical properties of the optical record medium 20, and the data is hence recorded on the optical record medium 20.

It is noted that the reading-writing pickup head described above is the preferred embodiment of the present invention for the purposes of illustration only, and is not intended as a definition of the limits and scope of the invention disclosed. Any modifications and variations that may be apparent to a person skilled in the art are intended to be included within the scope of the present invention.

What is claimed is:

1. A reading-writing pickup head for data access on an optical record medium, comprising:

laser source adapted to generate a polarized beam for data access;

photo detector adapted to transfer the light intensity of a reflected beam to an electric signal;

a birefringent prism placed on a light path of said pickup head, made of double-refraction material, and used to shape and split said polarized beam and said reflected beam;

an objective lens placed on said light path and used to focus said polarized beam onto said optical record medium; and a quarter-wave plate placed on said light path between said birefringent prism and said objective lens and used to make the polarizations of said polarized beam and said reflected beam orthogonal after said reflected beam passing therethrough.

2. The reading-writing pickup head as claimed in claim 1 wherein said pickup head includes a collimator placed on said light path for collimating said polarized beam.

3. The reading-writing pickup head as claimed in claim 1 wherein said pickup head includes a reflection mirror placed on said light path for changing the travel direction of said polarized beam.

* * * * *